April 16, 1957     T. A. O. GROSS     2,789,233
RADIATION MONITORS
Filed April 30, 1953

INVENTOR
THOMAS A. O. GROSS
BY
ATTORNEY

United States Patent Office 2,789,233
Patented Apr. 16, 1957

2,789,233

RADIATION MONITORS

Thomas A. O. Gross, South Lincoln, Mass., assignor to Raytheon Manufacturing Company, Newton, Mass., a corporation of Delaware Application April 30, 1953, Serial No. 352,080

3 Claims. (Cl. 250—83.6)

This invention relates to radiation monitors, and more particularly to those of the type utilizing an ionization chamber associated with an electrometer in an oscillatory circuit.

In a radiation monitoring instrument, it is desirable to have both high sensitivity and a reasonable accuracy in indicating radiation of a wide range of intensities, such as those between 0.1 roentgen and 25 roentgens per hour independently of the wave length of the gamma radiation. Such an instrument should be of light weight requiring a relatively low voltage for its operation. It should be rugged and insensitive to ambient light and temperature. It is also desirable that it have the ability to fail-safe; that is, the defects most likely to develop in the circuit should result in an indication of a dangerous condition rather than in no indication. The indication should be of an attention attracting nature, such as the flashing of a light or pulses of sound.

In the monitor of this invention, these requirements have been met by the use of a blocking oscillator circuit incorporating an electrometer tube operated at a low plate voltage with an ionization chamber included in the grid circuit. In operation, the ionization chamber acts as a grid-blocking capacitor in the blocking oscillator circuit. The impingement of radiation on the chamber ionizes the material in the chamber, usually a gas, and causes conduction, discharging any charge in the chamber and producing a pulse that is taken off by an additional winding on the transformer and applied to either a lamp or a transducer, such as an ear phone or loud-speaker. As particles arrive more frequently within the ionization chamber with an increase in the intensity of the radiation, the chamber is discharged more frequently. Thus, the rate of repetition of the resulting pulses is an indication of the intensity of the radiation.

The foregoing and other advantages, objects and features of the invention will be better understood from the following description taken in conjunction with the accompanying drawings wherein:

Fig. 3a is a schematic diagram of the indicator circuit using a lamp, while

Figure 1:
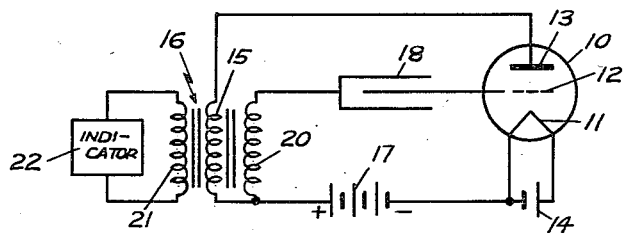
Fig. 1 is a schematic diagram of the circuit of the preferred embodiment of the invention.

In Fig. 1, the reference numeral 10 designates the electrometer tube which has a filament 11, a grid 12, and an anode 13. The filament 11 is connected to a source of heater potential 14. The anode 13 is connected to the filament 11 through the primary 15 of a pulse transformer 16 and a source of positive potential 17. The grid 12 is coupled to the filament 11 through an ionization chamber 18 and the secondary winding 20 of the transformer 16. In the circuit the tube input conductance serves as the grid-leak resistor. The transformer 16 has a third winding 21 by which the pulses resulting from the operation of the circuit are coupled to an indicating device 22.

Figure 2A:
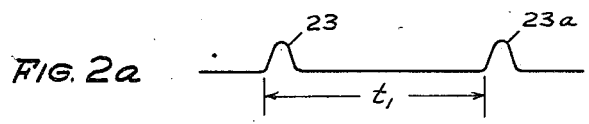
Fig. 2a is a time voltage diagram of the pulses resulting with little or no radiation impinging on the ionization chamber.
Figure 2B:
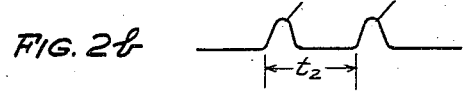
Fig. 2b is a voltage time diagram of the pulses resulting when the ionization chamber is exposed to intense radiation.

Initially due to the capacitor action of the ionization chamber 18, the grid 12 of the electrometer tube 10 is biased to cutoff. In the absence of radiation, the chamber 18 is slowly discharged by leakage currents until the plate current is sufficient to satisfy the conditions for oscillation of such a blocking oscillator. At this point, the grid 12 is driven suddenly positive, causing current to flow into the chamber 18 until the tube is blocked. The chamber 18 is thus recharged and the circuit can execute another cycle to produce the wave form 23, as shown in Fig. 2a. It will be noted that two such pulses, 23 and 23a, are separated by a time $t_1$. When the chamber 18 is illuminated by radiation, the time of its discharge is reduced by ion collection to produce pulses of the wave form 24, in Fig. 2b, where it will be seen that the pulses 24 and 24a are separated by a shorter interval $t_2$. The pulse repetition rate indicated by the interval of time $t_2$ is proportional to radiation. The sensitivity of the instrument can be shown to be proportional to the chamber volume and inversely proportional to its capacitance connected in shunt with the tube. During the time that the chamber 18 is charging, the plate current flowing through the winding 15 is large and considerable peak power is delivered to the winding 21. This peak can be matched to a wide range of impedances in the transducer or indicator circuit by the adjustment of the ratio between the turns in the windings 15 and 21. This ability to produce a high output voltage in the winding 21 permits the use of a condenser or crystal transducer, as the indicator device 22, even though the voltage of the potential source 17 is low.

In a circuit of this type, there is a tendency for the frequency or recurrence rate of the pulses to increase with decreasing battery voltage, tube emission, and shock resistances. Thus, the deterioration of the components of the circuit beyond their life in point is indicated by a gradual increase in the recurrence rate of the pulses under both the conditions of the presence and absence of radiation.

If the circuit of this invention is used with an ionization chamber of 20 cubic centimeters with an atmosphere of standard air, the ionization current will be approximately $2 \times 10^{-13}$ amperes when illuminated with 0.1 roentgen per hour. With this level of radiation, it can be shown that a 5-micromicrofarad chamber would yield a recurrence rate of slightly more than 2 pulses per minute. With a level of radiation of 25 roentgens per hour, the recurrence rate would be more than 7 pulses per second. This would give a useful range of pulse recurrence rates for the radiation intensities of interest.

Since the circuit of this invention can be operated with a plate voltage of between 15 and 30 volts and a filament range of between 20 and 30 milli-watts, it can be seen that the bulk of the power supply can be relatively small while its useful life can be relatively long.

Figure 3A:
Figure 3B:
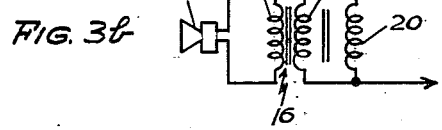
Fig. 3b is a schematic diagram of an audio type indicator circuit, specifically a loud-speaker.

The indicating device 22 of Fig. 1 may be a lamp 25, as shown in Fig. 3a, in which case the number of flashes per second indicates the intensity of radiation, or a transducer, such as the loud-speaker 26, shown in Fig. 3b, in which case the number of pulses of sound per second indicates the intensity of the radiation.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A radiation monitor comprising an electron discharge device having a cathode, a grid and a plate, a transformer having a primary and a secondary, a source of positive potential connected in series between the cathode, the primary of the transformer and the plate, an ionization chamber with its electrodes connected in series with the secondary of the transformer, the grid and the cathode of the electron discharge device, an indicating device, and means to couple said indicating device to the transformer to produce repetitive indications at a repetition rate proportional to the radiation impinging on the ionization chamber.

2. A radiation monitor comprising an electron discharge device having a cathode, a grid and a plate, a transformer having a primary and a secondary, a source of positive potential connected in series between the cathode, the primary of the transformer and the plate, an ionization chamber with its electrodes connected in series with the secondary of the transformer, the grid and the cathode of the electron discharge device, a lamp, and means to couple said lamp to the transformer to produce repetitive flashes at a repetition rate proportional to the radiation impinging on the ionization chamber.

3. A radiation monitor comprising an electron discharge device having a cathode, a grid and a plate, a transformer having a primary and a secondary, a source of positive potential connected in series between the cathode, the primary of the transformer and the plate, an ionization chamber with its electrodes connected in series with the secondary of the transformer, the grid and the cathode of the electron discharge device, an electroacoustic transducer, and means to couple said transducer to the transformer to produce repetitive pulses of sound at a repetition rate proportional to the radiation impinging on the ionization chamber.

References Cited in the file of this patent
UNITED STATES PATENTS

| | | |
|---|---|---|
| 2,609,511 | Wright | Sept. 2, 1952 |
| 2,620,446 | Le Vine et al. | Dec. 2, 1952 |
| 2,637,820 | McCreary | May 5, 1953 |